W. G. PERKINS & W. H. FITCH.
STEEL SMELTING FURNACE.
APPLICATION FILED DEC. 22, 1917. RENEWED JAN. 21, 1919.
1,295,586.
Patented Feb. 25, 1919.
4 SHEETS—SHEET 4.
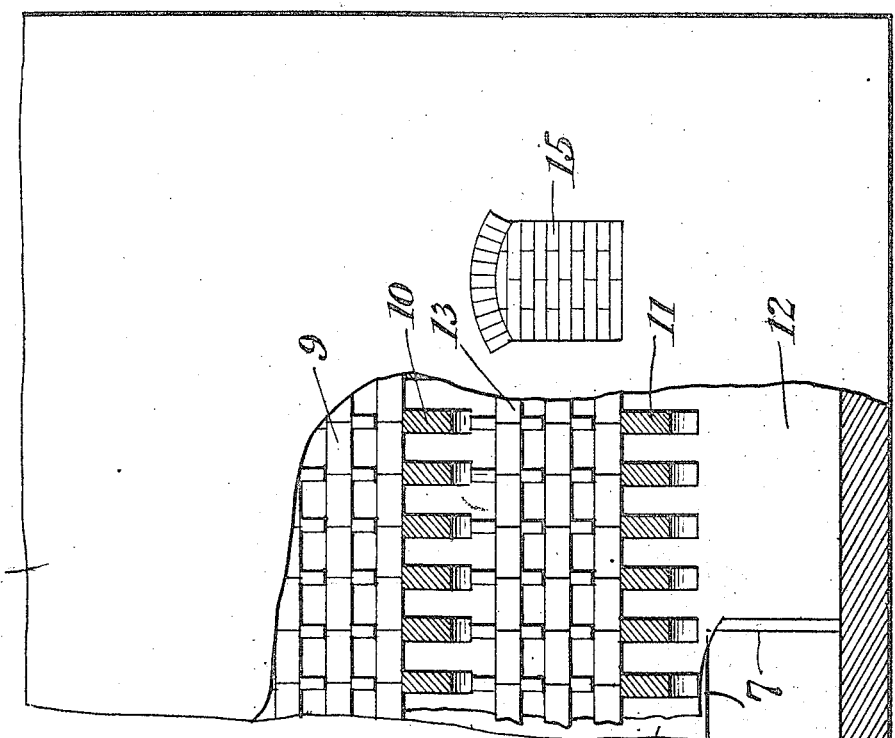
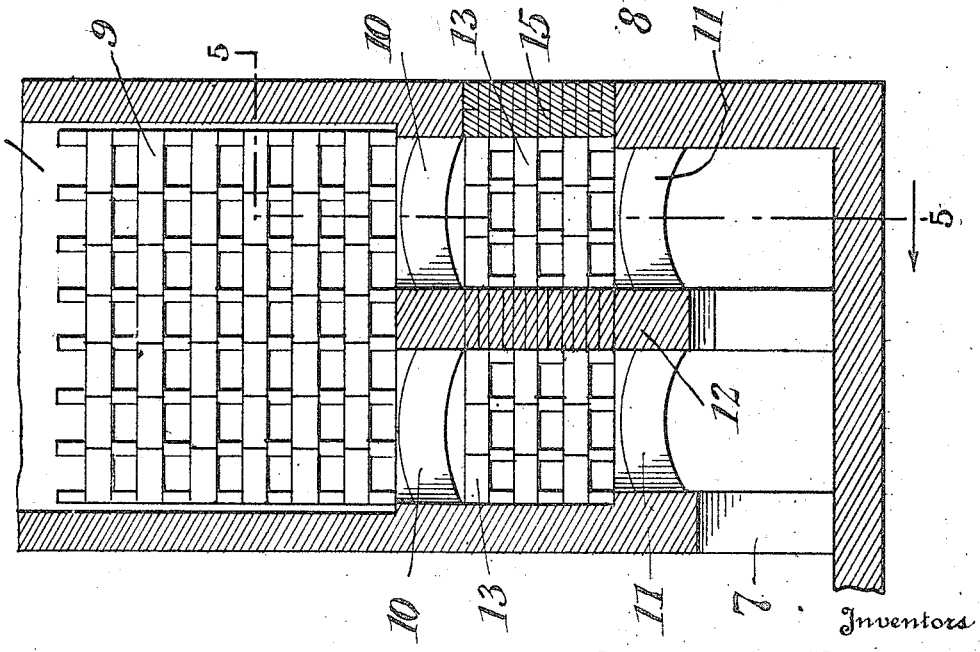

UNITED STATES PATENT OFFICE.

WALTER G. PERKINS, OF SAN FRANCISCO, CALIFORNIA, AND WILLIAM H. FITCH, OF PITTSBURGH, PENNSYLVANIA.

STEEL-SMELTING FURNACE.

1,295,586.　　　　　　　Specification of Letters Patent.　　Patented Feb. 25, 1919.

Application filed December 22, 1917, Serial No. 208,465. Renewed January 21, 1919. Serial No. 272,353.

*To all whom it may concern:*

Be it known that we, WALTER GEORGE PERKINS, a subject of the King of England, and WILLIAM HENRY FITCH, a citizen of the United States, residing, respectively, at San Francisco and Pittsburgh, in the counties of San Francisco and Allegheny and States of California and Pennsylvania, have invented certain new and useful Improvements in Steel-Smelting Furnaces; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in furnaces used in the art and manufacture of steel and in which liquid or other gaseous fuels are introduced into an open hearth reversing or end over end type of regenerator furnace, and in which are provided slag pockets and chambers for the precipitation of the dust from the waste fumes before entering the checker-work of the regenerator.

In the manufacture of steel as practised up to the present time, natural or producer gas as a fuel has been used in connection with the end over end regenerator furnace and the construction of the checker-work has always been under or below the hearth level, and waste gases have always gone through the checker on a down cast. This has been possible and practicable because neither the gas or the charge containing materials in the form of suspended matter, such as dust, would block the checkers and stop the flow of gas going down. At the present time such conditions have arisen where the supply of natural gas is becoming exhausted and producer gas is not looked upon with favor, because of the large heat unit losses in the conversion of coal to produce a gas, also the loss of heat by radiation, due to conveying gas from the gas producer to the furnace.

The development of pulverized fuel firing has become generally recognized as the future method of using fuel and it is beyond a doubt that if it is possible to inject into the furnace direct coal in a finely divided form so that it is to all intents and purposes a gas, losses of heat incurred in the manufacturing of producer gas may be averted. The objection, however, to using powdered fuel is that the ash of incombustible matter will be carried through the furnace with the fumes and deposited partly in the slag pockets and partly in the top of the down cast checker. Various types of checker-work have been used to overcome this difficulty, but it appears that the principle of a down cast checker will always have the disadvantage of clogging, if the sizes of the openings are such as to give any efficiency in the checker itself for regenerative purposes.

The present invention consists in the provision of means for taking in fuel from the bottom of the regenerator instead of the top, as is the common practice, so that all waste gases may have an up cast instead of a down cast, so that when the dust passes into the regenerator chamber it will be precipitated and be prevented from clogging the chamber resulting from the up cast current, while the cold air is permitted to enter the chamber from the top of the regenerator and pass to the furnace in exactly the reverse from that taken by waste gases.

Another feature of the present invention consists in the provision of means whereby portions of the rows of the checker-work are so constructed and arranged as to be independent of other tiers of the checker-work, so that such portions as may be subjected to intense heat may be removed and replaced by temporarily closing the fuel supply from the furnace without interference with the super-structure of the checker-work.

The present invention consists of various details of construction, combinations and arrangements of parts which will be hereinafter fully described, shown in the accompanying drawings and then specifically defined in the appended claims.

Our invention is illustrated in the accompanying drawings, which, with the letters of reference marked thereon, form a part of this specification and in which:

Fig. 4 is an enlarged vertical sectional view showing in elevation the arrangement of the checker-work with removable tier, and Fig. 5 is a sectional view on line 5—5 of Fig. 4.

Figure 1:
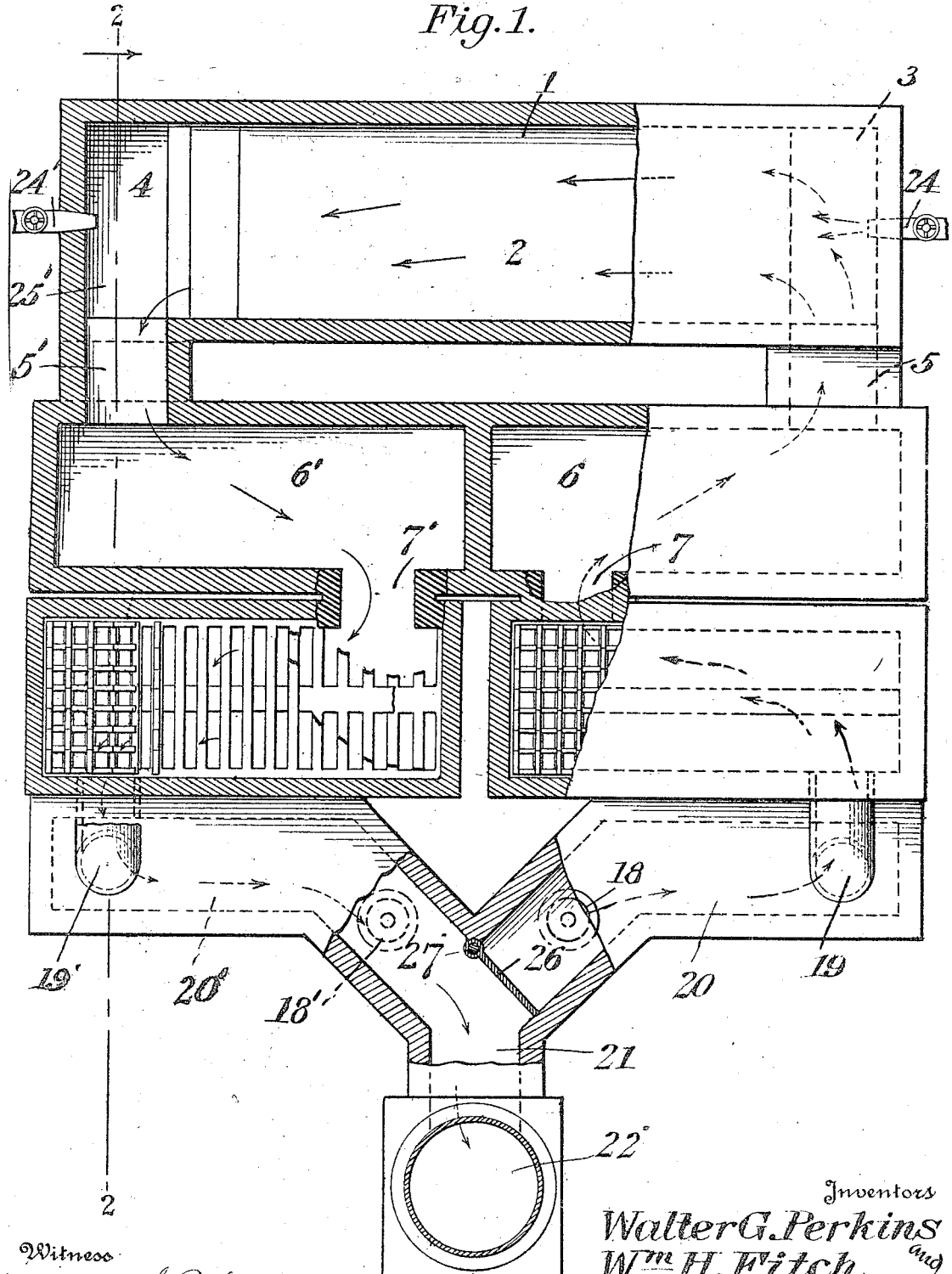
Figure 1 is a plan view of our improved steel smelting furnace, parts being in section.
Figure 2:
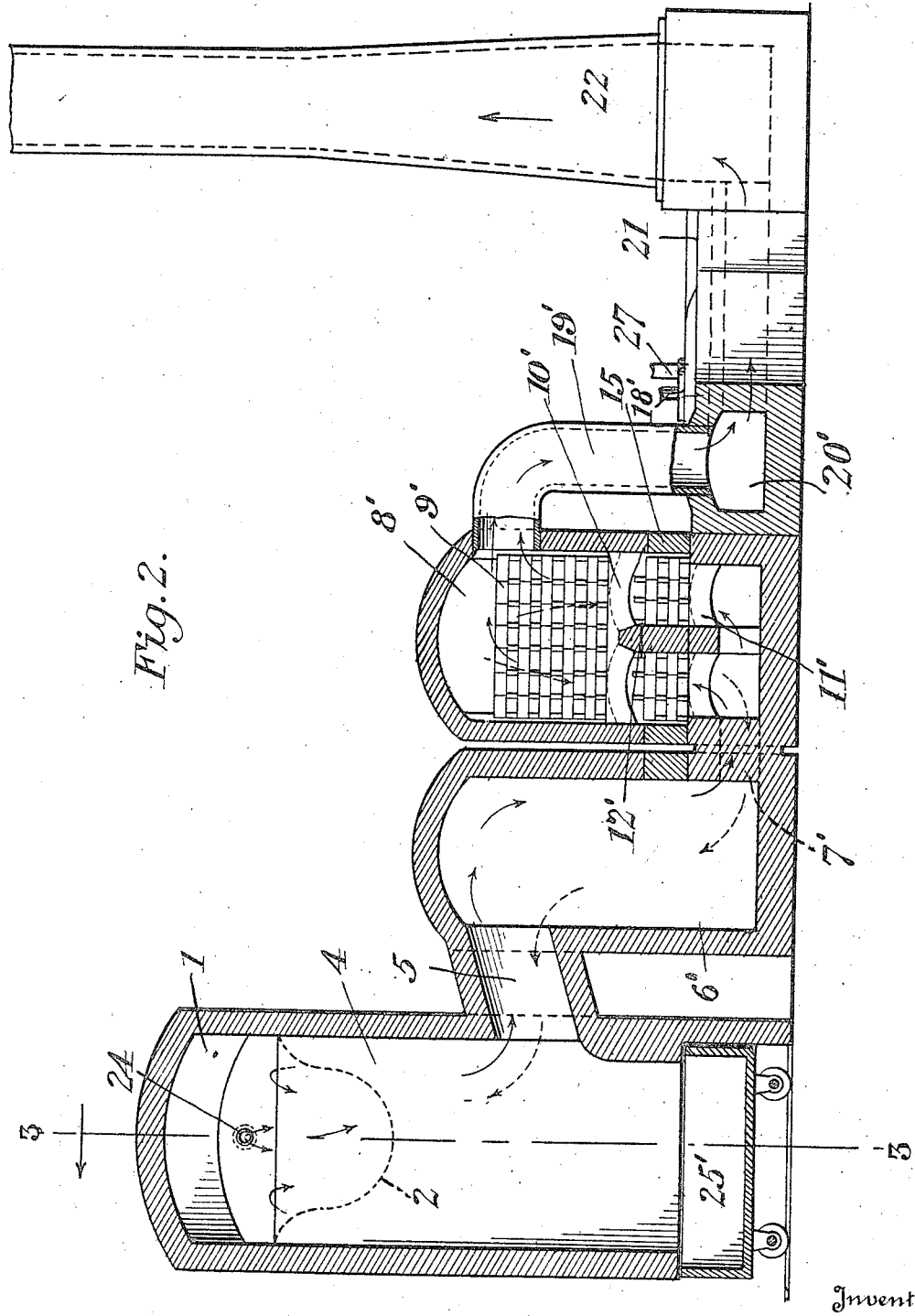
Fig. 2 is a vertical sectional view on line 2—2 of Fig. 1.

Reference now being had to the details of the drawings by numerals:

1 designates a furnace with a dished bottom 2 and with which furnace passageways 3 and 4 communicate at points opposite each other. The passageway 3 communicates with a slag pocket $3^x$, while the passageway 4 communicates with a slag pocket $4^x$, and the slag pocket $3^x$ communicates with a port 5 leading to the dust chamber 6, and which latter communicates through a passageway 7 with the interior of the regenerator chamber 8 having a checker-work 9 therein. A passageway 19 leads from the upper portion of the regenerator chamber 8 and communicates with a duct 20 which leads to a passageway 21. The latter in turn communicates with the chimney 22.

Figure 3:
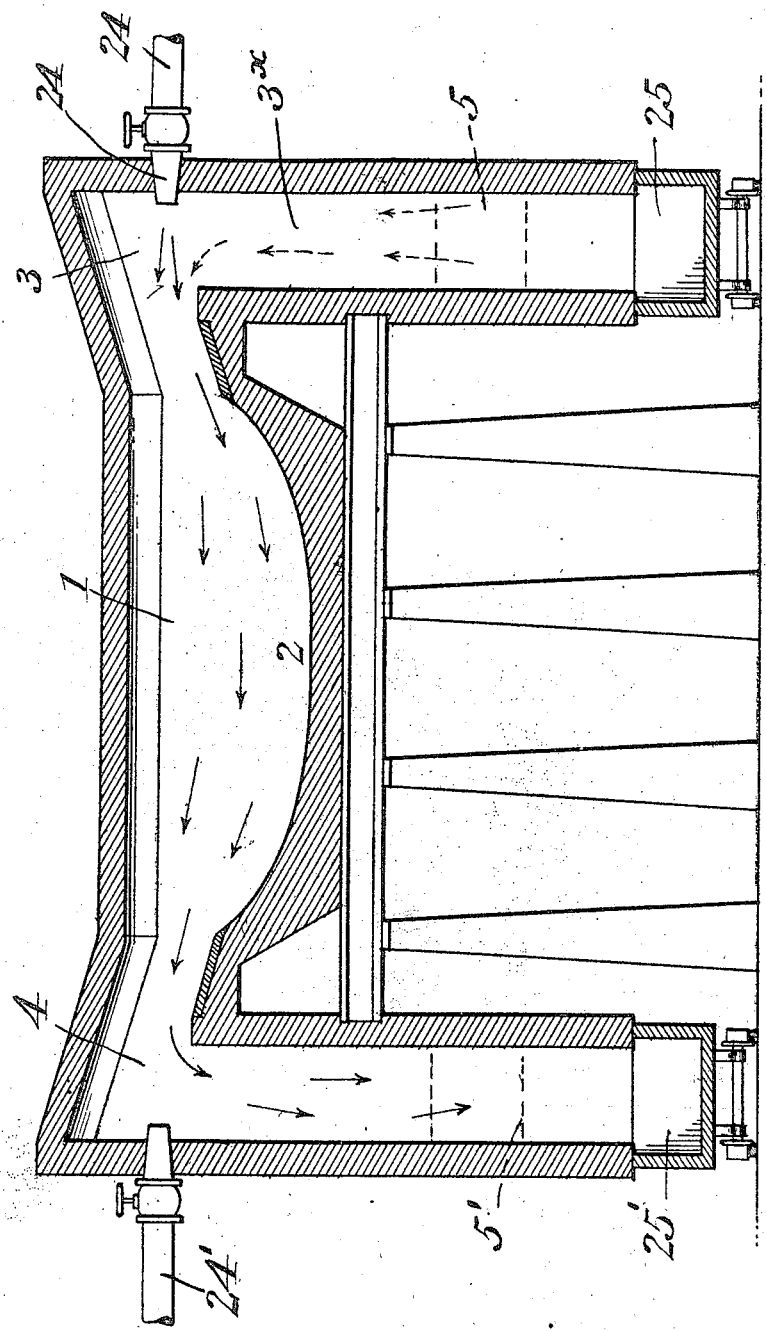
Fig. 3 is a sectional view on line 3—3 of Fig. 2.

The passageway 4 which communicates with the furnace 1 opposite the passageway 3, as shown in Figs. 1 and 3 of the drawings, communicates with the slag pocket $4^x$ which in turn communicates with the interior of the dust chamber 6′ through the port 5′, and leading from the lower portion of the chamber 6′ is a port 7′ communicating with the lower portion of the regenerator chamber 8′. Leading from the upper portion of the regenerator chamber 8′ is a passageway 19′ communicating with a duct 20′ which in turn leads to and communicates with the common passageway 21. A valve 26 is pivotally mounted upon a post 27 and is adapted to swing in order to close one or the other of the passageways 20 or 21 accordingly as it may be desired to direct into or out of operative relation, one or the other of the reversing or end over end type of regenerative furnaces, the present apparatus being so arranged as to alternately use the two regenerators in order to materially increase the efficiency of the apparatus.

Nozzles 24 and 24′ communicate respectively with the passageways 3 and 4 and through which liquid or gaseous fuels are introduced into the furnace. In order to permit live air to enter the apparatus to be pre-heated before being commingled with the gaseous fuel, valved openings 18 and 18′ are placed respectively in the walls of the passageways 20 and 21, as shown clearly in Fig. 1 of the drawings.

Positioned underneath the slag pocket $3^x$ is a truck 25, and underneath the slag pocket $4^x$ is a similar truck 25′ provided for the purpose of conveying away the slag from the pockets.

Referring to Figs. 4 and 5 it will be seen that the construction of our apparatus is such that means is provided for removing certain tiers of the checker-work without interference with the superimposed tiers thereof when it becomes necessary, owing to the extreme high temperature that the lower tiers are subjected to in the operation of the apparatus, and in which figures, it will be noted, two series of arches designated respectively by numerals 10 and 11, are provided which connect the side walls with a central wall 12, the tiers 9 of the checker-work being supported by the upper arches 10 independent of the tiers 13 which are supported by the arches 11. The wall of the regenerator chamber is provided with an opening 15 laid up with removable brick, affording means whereby access may be had between the two tiers of arches for the purpose of removing the brick 13 and replacing the same with other brick without interfering with the tiers of brick which are supported by the arches 10.

In operation, air entering the opening regulated by the valve 18 in the wall of the passageway 20 (it being noted that the course of air in the drawings is indicated by the dotted arrows), will pass through the checker-work of the regenerator 8 and become preheated, as well as cooling the checker-work by the absorption of its heat, and thence will pass through the port 7 into the dust chamber 6, through the latter and the passageway 5 into the bottom of the slag pocket $3^x$ and thence into the passageway 3, where it commingles with the incoming pulverized or gaseous fuel introduced into the furnace, through the nozzle 24, preferably under a slight pressure. The gaseous fumes passing in the direction indicated by the arrows in Figs. 1 and 3 of the drawings make exit from the furnace through the passageway 4 down through the slag pocket $4^x$, thence through the port 5′ into the dust chamber 6′, where an appreciable amount of the dust from the fumes is precipitated. The fumes pass from the dust chamber 6′ through the port 7′ into the lower portion of the regenerator chamber 8′ and up through the checker-work therein and thence down through the passageway 19′ into the duct 20′, and thence to the duct 21 and chimney 22.

After one side of the apparatus has been in operation in the manner described for any suitable length of time and it is desired to reverse conditions and permit the regenerator on the other side of the apparatus to be in operation, the valve 26 is thrown so as to close the passageway 20'. In this adjustment of the apparatus cold air enters through the opening regulated by the valve 18', in the roof of the regenerator chamber 8', the valve 18 in the other regenerator being closed as is also the nozzle 24 and the nozzle 24' is opened. Air passes down through the checker-work 9', becoming pre-heated as it passes through the port 7', dust chamber 6', port 5' into the slag pocket $4^x$ and thence through passageway 4 into the furnace 1.

What we claim to be new is:

1. A method of manufacturing steel, consisting in introducing a gaseous fuel commingled with pre-heated air into a regenerative furnace, the waste gases being expanded after leaving the furnace chamber and thence given an up-cast through the checker-work of a regenerator.

2. A method of manufacturing steel, consisting in introducing for alternate periods a gaseous fuel commingled with pre-heated air into a regenerative furnace, the waste gases being expanded after leaving the furnace chamber and thence given an up-cast through the checker-work of a regenerator.

3. A method of manufacturing steel, consisting in introducing a gaseous fuel commingled with pre-heated air into a regenerative furnace, the waste gases being expanded after leaving the furnace chamber and thence given an up-cast through the checker-work of a regenerator, the combustion of the gaseous fuel being promoted by air pre-heated passing down through the checker-work before entering into the regenerative furnace.

4. A method of manufacturing steel, consisting in introducing a gaseous fuel commingled with pre-heated air into a regenerative furnace, the velocity of the gaseous fumes being reduced and afterward given an up-cast through the checker-work of a regenerator.

5. An apparatus for the manufacture of steel, comprising a furnace with a slag pocket communicating with each end thereof, precipitating chambers each having a passageway leading from and communicating with a slag pocket, regenerators, each communicating below its checker-work with an adjacent precipitating chamber, each regenerator having an outlet in its upper portion.

6. An apparatus for the manufacture of steel, comprising a furnace with a slag pocket communicating with each end thereof, precipitating chambers each having a passageway leading from and communicating with a slag pocket, regenerators, each communicating below its checker-work with an adjacent precipitating chamber, a branching passageway communicating with each regenerator near its upper portion, and a valve mounted within the branching passageway, the latter being provided with air inlets.

In testimony whereof we hereunto affix our signatures in presence of two witnesses.

WALTER G. PERKINS.
WILLIAM H. FITCH.

Witnesses:
　A. L. HOUGH,
　FRANKLIN H. HOUGH.